(12) United States Patent
Pflueger

(10) Patent No.: US 10,644,291 B2
(45) Date of Patent: May 5, 2020

(54) BATTERY COMPRISING BATTERY CELLS WHICH ARE MECHANICALLY CONNECTED TO ONE ANOTHER

(71) Applicants: Robert Bosch GmbH, Stuttgart (DE); Samsung SDI Co., Ltd., Yongin-si, Gyeonggi-do (KR)

(72) Inventor: Claus Gerald Pflueger, Markröningen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 556 days.

(21) Appl. No.: 14/411,000

(22) PCT Filed: Jun. 4, 2013

(86) PCT No.: PCT/EP2013/061466
§ 371 (c)(1),
(2) Date: Dec. 23, 2014

(87) PCT Pub. No.: WO2014/001034
PCT Pub. Date: Jan. 3, 2014

(65) Prior Publication Data
US 2015/0188115 A1 Jul. 2, 2015

(30) Foreign Application Priority Data
Jun. 27, 2012 (DE) .................. 10 2012 211 008

(51) Int. Cl.
*H01M 2/20* (2006.01)
*H01M 2/10* (2006.01)
(Continued)

(52) U.S. Cl.
CPC ......... *H01M 2/206* (2013.01); *H01M 2/0245* (2013.01); *H01M 2/1016* (2013.01);
(Continued)

(58) Field of Classification Search
CPC .. H01M 2/206; H01M 2/1077; H01M 2/1016; H01M 2/1061; H01M 2/0245
See application file for complete search history.

(56) References Cited

U.S. PATENT DOCUMENTS 4,339,049 A * 7/1982 Gillespie ............ B65D 21/0202
220/23.4
5,891,589 A * 4/1999 Witzigreuter ....... H01M 2/0207
429/151
(Continued)

FOREIGN PATENT DOCUMENTS

AU 65799/96 A 9/1996
DE 10 2010 013 028 A1 9/2011
(Continued)

OTHER PUBLICATIONS

International Search Report corresponding to PCT Application No. PCT/EP2013/061466, dated Aug. 29, 2013 (German and English language document) (5 pages).

*Primary Examiner* — Jonathan G Jelsma
(74) *Attorney, Agent, or Firm* — Maginot, Moore & Beck LLP

(57) ABSTRACT

A battery, such as a lithium-ion battery, includes two battery cells electrically wired together. Each battery cell includes a battery cell housing, having a connecting structure. The connecting structure of one of the two battery cell housings is configured to engage the connecting structure of the other of the two battery housings in a force-fitting and an interlocking manner to mechanically connect the two battery cells.

14 Claims, 1 Drawing Sheet

(51) Int. Cl.
*H01M 2/02* (2006.01)
*H01M 10/0525* (2010.01)
(52) U.S. Cl.
CPC ....... *H01M 2/1061* (2013.01); *H01M 2/1077* (2013.01); *H01M 10/0525* (2013.01); *H01M 2220/20* (2013.01)

(56) References Cited

U.S. PATENT DOCUMENTS

| | | | |
|---|---|---|---|
| 8,288,035 B2* | 10/2012 | Li | H01M 2/0245 429/121 |
| 2003/0193313 A1 | 10/2003 | Takedomi et al. | |
| 2006/0063067 A1* | 3/2006 | Kim | H01M 2/021 429/148 |
| 2006/0220615 A1* | 10/2006 | Kim | H01M 2/202 320/116 |
| 2008/0050656 A1 | 2/2008 | Eisenbeiser | |
| 2011/0256446 A1* | 10/2011 | Bronczyk | H01M 2/1077 429/163 |
| 2011/0269011 A1* | 11/2011 | Park | H01M 2/0413 429/158 |
| 2013/0207459 A1* | 8/2013 | Schroder | H01M 2/1077 307/10.1 |

FOREIGN PATENT DOCUMENTS

| | | |
|---|---|---|
| EP | 0 065 349 A1 | 11/1982 |
| WO | 2010/095634 A1 | 8/2010 |

* cited by examiner

BATTERY COMPRISING BATTERY CELLS WHICH ARE MECHANICALLY CONNECTED TO ONE ANOTHER

This application is a 35 U.S.C. § 371 National Stage Application of PCT/EP2013/061466, filed on Jun. 4, 2013, which claims the benefit of priority to Serial No. DE 10 2012 211 008.9, filed on Jun. 27, 2012 in Germany, the disclosures of which are incorporated herein by reference in their entirety.

The present disclosure relates to a battery and battery cells, wherein, in addition to the force-fitting connection, the battery cells can be connected to one another in an interlocking manner. The battery cells are in a battery housing and are wired to one another in series or in parallel and are mechanically connected to one another. The disclosure further relates to a motor vehicle which contains a battery of this kind.

BACKGROUND

It would appear that, in the future, new battery systems will be used both in stationary applications, such as wind turbines, in motor vehicles which are designed as hybrid or electric motor vehicles, and also in electronic appliances, such as laptops or mobile telephones, with very stringent requirements being placed on said battery systems in respect of reliability, safety, performance and service life.

Lithium-ion technology is suitable for a wide field of use. It is distinguished, amongst other things, by a high energy density and an extremely low level of self-discharge.

Lithium-ion cells of this type usually comprise an electrode which can reversibly incorporate lithium ions during the course of so-called intercalation or can remove them again during the course of so-called deintercalation. The intercalation takes place during the process of charging the battery cell, and the deintercalation takes place during the discharging of the battery cell for the power supply of electrical assemblies.

Battery systems are usually constructed from individual units (so-called sub-units) which can be further subdivided into battery cell modules in respect of the integration stage. The battery cell modules are constructed from battery cells, such as lithium-ion cells for example, which are wired in series and/or in parallel. In order to be fixed, said modules are braced to one another.

In automotive applications of lithium-ion storage technology, it is necessary to always ensure a stable mechanical connection between cells and a reliable cell pressure connection. Under no circumstances should there be relative movement between the cells. It is necessary for this to always be ensured under boundary conditions which are typical in automobiles, such as acceleration, vibration, crash etc. At present, this is realized by means of a force-fitting/frictional connection or an additional separate interlocking connection.

EP0065349A discloses a battery having a large number of individual cell containers which are clamped to one another and are provided with air gaps in the intermediate spaces. The air gaps serve to cool the battery. Each container is defined by thin, heat-permeable, plastic end walls. Said wall is too weak to withstand buckling. A large number of small projections are distributed over the end walls of the adjacent container walls across the gap and prevent distortion of the end walls by compensating for the internal forces of one container with the internal forces of the next container. Additional interleaving projections on the end walls make it easier to align the containers during fitting and prevent the containers from shifting relative to one another after assembly.

US2008050656 discloses a monolithically integrated thin-film lithium battery which ensures increased surface density capacity on a single level (without stacking of a plurality of cells). The thin-film lithium battery comprises a substrate which is patterned with a surface which has a large number of openings and is angled at the sides. The angles are between 10 and 80 degrees in relation to the surface.

WO10095634 discloses a solar battery module in which a first solar battery cell with a first conductive substrate having a photoreceptor area and a non-photoreceptor area is provided. The substrate is preferably provided with microscopic surface unevennesses, this being known as a structure.

DE102010013028 discloses a composite cell having a predefinable number of individual cells which are wired to one another in parallel and/or in series, wherein the respective individual cell has a housing which is formed from sheet-metal enclosures and an electrically insulating housing frame which is arranged between said sheet-metal enclosures, and the individual cells which are arranged next to one another are pressed against one another in the axial direction using at least one clamping element.

AU9665799 discloses an apparatus which comprises at least two cells and one or more electrical connectors and also positioning elements. The positioning elements are in the form of complementary plugs and sockets, for example a plurality of raised ribs, which are provided on the cells. The ribs are arranged such that a cell is positively located in relation to an adjacent cell.

SUMMARY

One or more problems with the prior art are resolved or at least lessened by the present disclosure. The disclosure provides a battery, in particular a lithium-ion battery, which comprises at least two battery cells having a battery cell housing, which battery cells are wired to one another in series or in parallel and are mechanically connected to one another. One characterizing feature is that the battery cells which adjoin one another each have a structure on the battery cell housing, wherein, in addition to the force-fitting connection, the battery cells can be connected to one another in an interlocking manner.

The battery cell housing can be composed of any desired metal or any desired metal alloy. For example, the housing can be produced from stainless steel, but the housing or housing part is in particular composed of aluminum or an aluminum alloy.

In the present disclosure, the battery is a lithium-ion battery. Owing to the use of lithium-ion technology, particularly high energy storage densities can be achieved, this leading to further advantages particularly in the field of electromobility.

The disclosure is based on the knowledge that the flow of force can be carried in an optimum manner by the present interlocking connection. The force-fitting/frictional connection can transmit only low forces given an appropriate space requirement. For this reason, an additional interlocking connection is currently integrated, in order to fix the cells in the event of an overload. Owing to the disclosure, the force-fitting/frictional connection is significantly intensified without additional space being required and is integrated in a differently arranged interlocking connection.

In this case, the structure is a surface pattern which can have different shapes and angles. The structure can be produced by the following methods: die-casting methods, deep drawing or thermoforming methods, shaping methods, cutting and rolling methods. In other words, the structure has an embossment on the adjacent outer surfaces of the battery cells, the battery cells being connected as a result of engaging one in the other by virtue of said embossment.

One advantage of the present disclosure is that the force-fitting/frictional connection between the cells and the cell pressure connection are considerably improved given the same installation space. In the case of the present disclosure, the interlocking connection is integrated and as a result the force-fitting connection is advantageously carried in an optimum manner. A further advantage of the present disclosure is that the battery cells are connected to one another such that the battery cells cannot become detached in the assembled state. Furthermore, the costs and the complexity are advantageously reduced.

The present disclosure relates, in particular, to the use of so-called hard-case cells which have a prismatic or cylindrical metal housing. However, the disclosure is not only directed at lithium-ion battery cells in this case, but rather also at other chemical systems, such as nickel-metal hydride cells and lithium metal polymer cells for example, which have a corresponding metal housing.

According to one advantageous refinement of the disclosure, the structure is stamped into the battery cell housing of the battery cell. This advantageously secures the connection between the battery cells.

According to a preferred embodiment of the disclosure, provision is made for the structure to be formed such that the structured surfaces engage with one another in line with the key and lock principle. The advantageous result of this key and lock principle is that the battery cells cannot become detached and a stable mechanical connection between the cells is ensured.

According to a further preferred embodiment of the disclosure, provision is made for the structure to be linear or crossed in relation to one another. This advantageously ensures that the flow of force is intensified and guided in an optimum manner.

In a particular embodiment, provision is further made for the raised portions and/or recesses which form the structure to have a meandering pattern, as a result of which the connection between the battery cells is advantageously intensified.

As an alternative, provision is advantageously made for the structures to be at an angle of from 1° to 90° in relation to one another. The angle of 1° to 90° describes the angle which is parallel or perpendicular to the outer edges of the metal housing in the structure. Furthermore, the angle of 1° to 90° is provided between the single structures in a crossed structure.

Furthermore, the structure can be of undirected, that is to say neutral, design.

According to a further refinement of the disclosure, the structure is circular or polygonal, as a result of which the holding force of the battery cells is intensified.

The disclosure additionally provides a motor vehicle comprising a battery, wherein the battery is connected to a drive system of the motor vehicle.

Advantageous developments of the disclosure are specified in the dependent claims and described in the description.

BRIEF DESCRIPTION OF THE DRAWINGS

Exemplary embodiments of the disclosure will be explained in greater detail with reference to the drawings and the following description. In the drawings.

DETAILED DESCRIPTION

Figure 1:
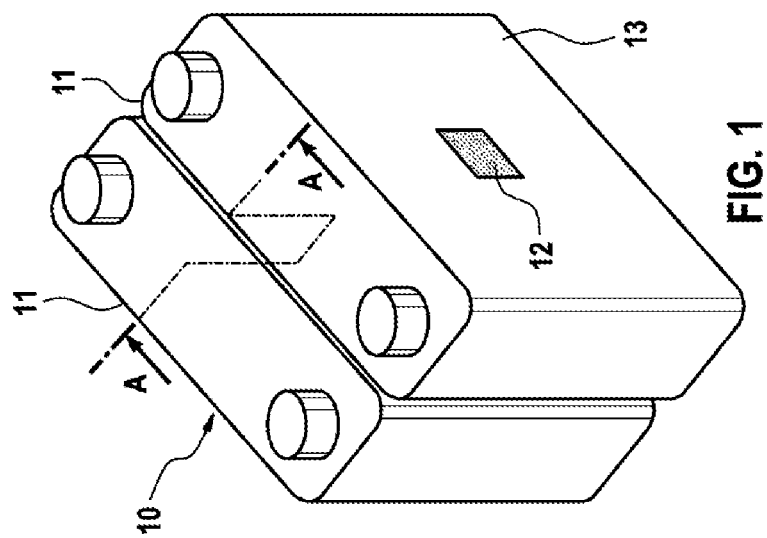
FIG. 1 shows a schematic illustration of the battery according to the disclosure with a structured surface.

FIG. 1 shows a battery 10 having a metal housing 13 of a lithium-ion battery, wherein individual battery cells 11 each have a structure 12 on the outer surface of the battery cell housing 13. A structure 12 is stamped into the outer enclosure of the battery cell 11 and/or into the components for cell pressure connection and cell fixing. This structure 12 is designed such that two opposite structured surfaces 12 engage with one another in line with the key and lock principle. In this case, the structure 12 can be linear and crossed and be at any desired angle in relation to one another.

Furthermore, the structure 12 can be of circular or polygonal design on the outer surface of the battery cell 11. Owing to the tooth system, the force-fitting/frictional connection is intensified and a certain interlocking connection is achieved. The interlocking connection is situated exactly at the points at which the maximum loading occurs and has to be transmitted. Furthermore, the structure can be of undirected, that is to say neutral, design. The structure 12 can be produced by different methods. In particular, said structure can be produced by die-casting methods, deep-drawing or thermoforming methods, shaping methods, cutting and rolling methods. The structure 12 has an embossment on the adjacent outer surfaces of the battery cells 11, the battery cells 11 being connected as a result of engaging one in the other by virtue of said embossment.

Figure 2:
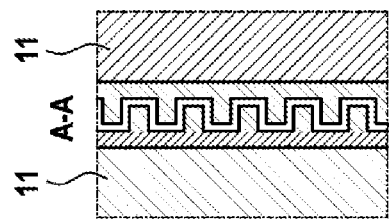
FIG. 2 shows a schematic sectional illustration of the structured surface.

FIG. 2 shows the sectional illustration of the structured surfaces 12 of two battery cells 11. The raised portions and recesses of the structure 12 have a meandering pattern in this case, it being possible for said pattern to be both in the form of sawteeth and right angles.

Figure 3:
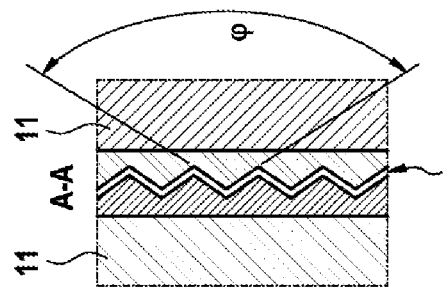
FIG. 3 shows a surface structure on the cell surface.

FIG. 3 shows a surface pattern on the cell surface. FIG. 3 shows two battery cells 11 which each have a structure 12 on the cell surface. This structure 12 is designed such that two opposite structured surfaces 12 engage with one another in line with the key and lock principle.

The invention claimed is:

1. A battery, comprising:
   two battery cells each having a battery cell housing, the two battery cells electrically wired to each other,
   wherein the battery cell housing of each of the two battery cells has a planar surface incorporating an integral connecting structure, the connecting structure of one of the two battery cell housings configured to engage the connecting structure of the other of the two battery housings in a force-fitting and an interlocking manner to mechanically connect the two battery cells to each other, and
   wherein the connecting structure is provided as a single component limited to a center position on the planar surface of the housing, the single component defining a force-fitting and interlocking structure.

2. The battery as claimed in claim 1, wherein the connecting structures are stamped into the battery cell housings.

3. The battery as claimed in claim 1, wherein:
   the connecting structure of one of the battery cell housings includes a lock element;
   the connecting structure of the other of the battery cell housings includes a key element; and the lock and key elements are configured to be engaged in an interlocking manner to mechanically connect the two battery cells to each other.

4. The battery as claimed in claim 1, wherein the connecting structures are linear or crossed in relation to each other.

5. The battery as claimed in claim 1, wherein the connecting structures each include corresponding raised portions and/or recesses.

6. The battery as claimed in claim 5, wherein the corresponding raised portions and/or recesses have a meandering pattern.

7. The battery as claimed in claim 1, wherein the connecting structures are at an angle of from 1° to 90° in relation to each other.

8. The battery as claimed in claim 1, wherein the connecting structures are configured with a neutral design.

9. The battery as claimed in claim 1, wherein the connecting structures are configured so as to be circular.

10. The battery as claimed in claim 1, wherein the battery is configured as a lithium-ion battery.

11. The battery as claimed in claim 1, wherein the two battery cells are electrically wired to each other in series.

12. The battery as claimed in claim 1, wherein the two battery cells are electrically wired to each other in parallel.

13. The battery as claimed in claim 1, wherein the connecting structures are configured so as to be polygonal.

14. A motor vehicle comprising:
a drive system; and
a battery including two battery cells electrically wired to each other and each having a battery cell housing, the battery cell housing of each of the two battery cells having a planar surface incorporating an integral connecting structure, the connecting structure of one of the two battery cell housings configured to engage the connecting structure of the other of the two battery housings in a force-fitting and an interlocking manner to mechanically connect the two battery cells to each other,
wherein the battery is connected to the drive system, and
wherein the connecting structure is provided as a single component limited to in a center position of the housing, the single component defining a force-fitting and interlocking structure.

* * * * *

UNITED STATES PATENT AND TRADEMARK OFFICE
CERTIFICATE OF CORRECTION

PATENT NO. : 10,644,291 B2
APPLICATION NO. : 14/411000
DATED : May 5, 2020
INVENTOR(S) : Claus Gerald Pflueger Page 1 of 1

It is certified that error appears in the above-identified patent and that said Letters Patent is hereby corrected as shown below:

In the Claims

In Claim 14, at Column 6, Line 19, delete the word "in" between the words "to" and "a".

Signed and Sealed this
Twenty-fourth Day of November, 2020

Andrei Iancu
*Director of the United States Patent and Trademark Office*